March 15, 1932. J. E. RENFER 1,849,155
AIR LINE OILER
Filed July 27, 1928
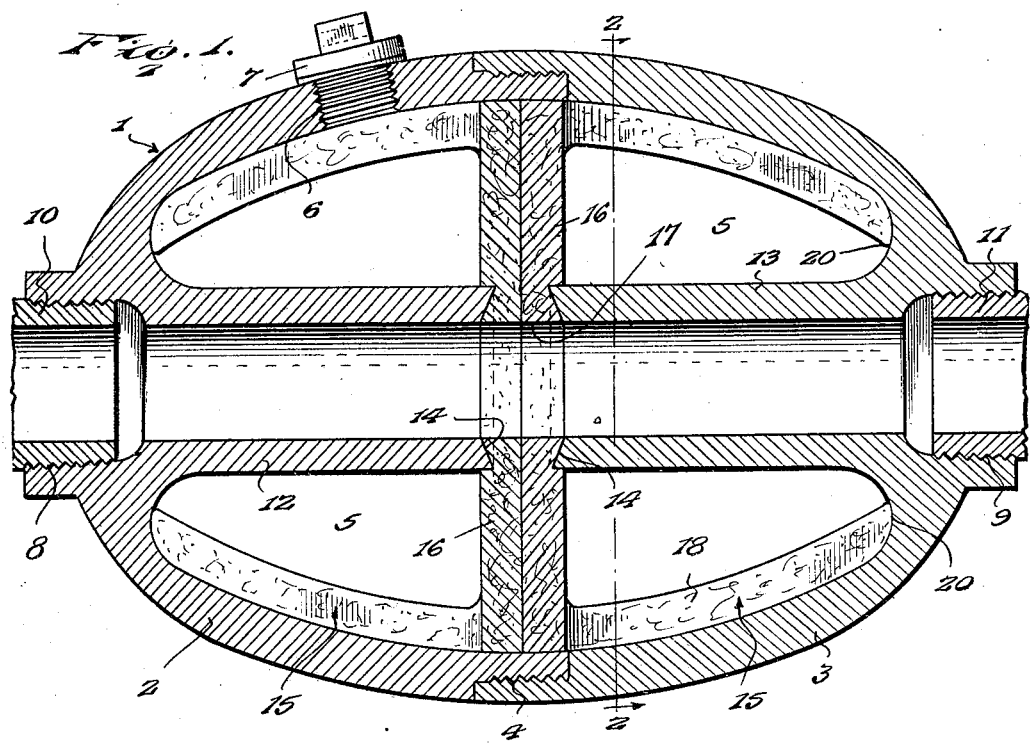
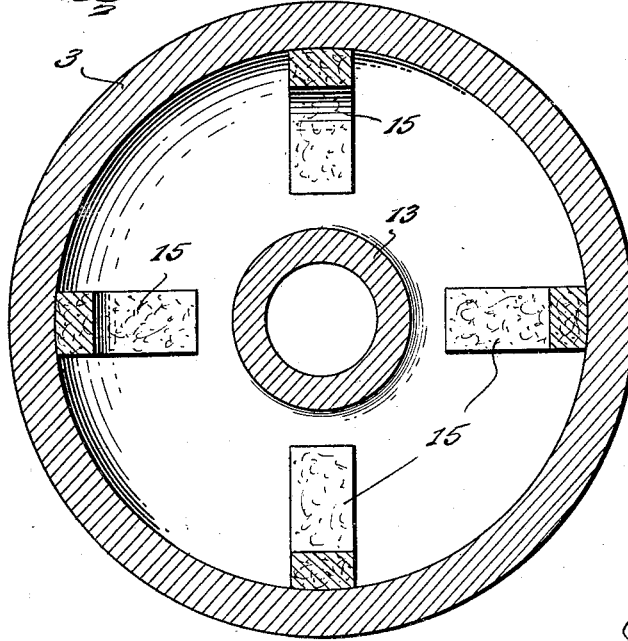
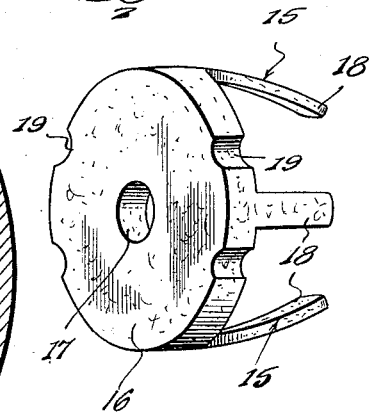
Inventor
J. E. Renfer
By
Attorney Patented Mar. 15, 1932

1,849,155

UNITED STATES PATENT OFFICE

JOHN E. RENFER, OF CLEVELAND, OHIO, ASSIGNOR TO THE CLEVELAND ROCK DRILL COMPANY, OF CLEVELAND, OHIO

AIR LINE OILER

Application filed July 27, 1928. Serial No. 295,668.

The present invention is directed to improvements in air line oilers.

The primary object of the invention is to provide a device of this character so constructed that the pressure fluid from the air line will pass through the device and carry with it an adequate supply of oil for lubricating effectively the working parts of the drill.

Another object of the invention is to provide a device of this character so constructed that the same will supply oil to the pressure fluid regardless of the position of the device.

Another object of the invention is to provide an oiler of this nature constructed in such manner that oil will be furnished to the drill without interruption, and in quantity to prevent over or under oiling of the parts.

In the accompanying drawings:

Figure 1 is a longitudinal sectional view through the device.

Figure 2 is a sectional view on line 2—2 of Figure 1.

Figure 3 is a perspective view of one of the capillary members.

Referring to the drawings, 1 designates a casing consisting of substantially semi-ellipsoidal sections 2 and 3, said sections being preferably threaded for detachable connection, as at 4.

These sections are hollow in order that when connected a reservoir 5 is provided for containing oil. The section 2 is provided with a filling opening 6, normally closed by a screw plug 7.

The outer ends of the sections 2 and 3 are provided, respectively, with sockets 8 and 9, in which are pipe connections 10 and 11, which serve as means for securing the casing in the air line.

Formed integral with the respective sections are tubes 12 and 13 which are alined with the pipe connections 10 and 11, in order that an air passage will be disposed along the longitudinal axis of the casing, said tubes being of such diameter that ample space will be provided therearound for containing oil. It will be observed that the confronting ends of the tubes, are beveled as at 14, the purpose of which will appear later.

In order that oil will commingle with the pressure fluid passing through the tubes 12 and 13, and in limited quantities, members 15—15 are provided, which are formed from felt, but it will be understood that any other material having capillary properties may be used in lieu of felt.

These elements consist of circular bodies 16 having central passages 17. Formed integral with the bodies and extending from the peripheries thereof are extensions 18, preferably four in number.

The peripheries of the bodies are provided with transverse grooves 19, the open sides thereof being closed by the walls of the sections 2 and 3. Obviously, when the device is assembled the grooves 19 will permit oil to pass from one section to the other.

When the sections 2 and 3 are in assembled relationship with the members 15 the confronting faces thereof will be in intimate contact and maintained in place by the opposed ends of the tubes 12 and 13, the beveled ends thereof obviously preventing slippage of the members 15.

The extensions 18 will lie against the inner walls of the sections, said extensions being of such length that their terminals will rest against the curved end walls 20 of the respective sections.

Briefly the operation is as follows:—

Some pressure fluid passing through the alined tubes will seep through the bodies 16 and build up a pressure in the reservoir, but when the drill is in operation pulsations will occur in the pressure fluid causing a slight decrease of pressure in the air line, whereupon the air in the reservoir will expand. This expansion will force oil from the bodies 16, which will be carried by the pressure fluid entering the tubes from the air line, into the drill to lubricate the working parts thereof.

Owing to the extensions 18, thorough saturation of the bodies 16 is assured, and said bodies by their capillary properties will maintain a supply of oil at a point to readily mix with the incoming pressure fluid. It will also be observed, that even if the supply of oil in the reservoir is low, a sufficient quantity will be fed by capillary attraction into the path of pressure fluid to be carried therewith to the drill, regardless of the position of the reservoir, since at all times parts of the members 15 will be submerged in oil.

Although the foregoing description is necessarily of a detailed character in order that the invention may be fully set forth, it is to be understood that the specific terminology employed is not to be construed as restrictive or confining, and that modifications and rearrangements of parts may be resorted to without departing from the spirit or scope of the following claims.

What is claimed is:—

1. An air line oiler comprising a casing constituting an oil reservoir, alined tubes disposed within the casing for the passage of pressure fluid, members having capillary properties, and including circular bodies, said bodies being engaged between the opposed ends of the tubes and having passages therein which register with each other and with the bores of the tubes, said bodies serving to conduct oil by capillary attraction to the tubes, as and for the purpose set forth.

2. An air line oiler comprising a casing constituting an oil reservoir, said casing having tubes extended from the ends thereof into the reservoir, with their inner ends spaced, fabric members in the reservoir including circular bodies having central passages therein, said bodies being confined between the inner ends of the tubes with the passages thereof in registration with the bores of the tubes, said bodies having extensions carried thereby which extend longitudinally of the reservoir, as and for the purpose set forth.

3. An air line oiler comprising a casing constituting an oil reservoir, said casing consisting of a pair of detachably connected sections, tubes carried by the sections and extending into the reservoir with their opposed ends spaced, fabric members in the reservoir having portions thereof engaged between the opposed ends of the tubes, and serving by capillary action to furnish oil to the tubes.

4. An air line oiler comprising a casing constituting an oil reservoir, tubes in the casing for conducting pressure fluid through the reservoir, and fabric members in the reservoir including circular bodies for conducting oil from the reservoir to the tubes, said bodies being disposed transversely of the casing to divide the same into separate chambers and having grooves in their peripheries to permit oil to pass to opposite sides of the bodies.

5. An air line oiler comprising an oil reservoir adapted to be associated with an air line, a passage establishing communication between said air line and said reservoir, and means for maintaining oil at the junction of said passage and said air line irrespective of the position of said reservoir or the quantity of oil therein, said means effective to divide said reservoir into a plurality of chambers.

6. An air line oiler comprising an oil reservoir adapted to be associated with an air line, a passage establishing communication between said air line and said reservoir, and capillary means in said passage arranged to contact the oil in said reservoir irrespective of the position thereof or the quantity of oil therein, said means effective to divide said reservoir into a plurality of chambers.

7. An air line oiler including a pair of sections adapted to be detachably secured together, each section including a tube adapted to be associated with an air conduit, and capillary means adapted to be clamped between said tubes when said sections are secured together.

8. An air line oiler including an oil reservoir, an air conduit associated therewith, and capillary means positioned in said reservoir and communicating with said air conduit and substantially every portion of the inner surface of said reservoir, whereby said capillary means conducts oil from said reservoir to said conduit irrespective of the position of said reservoir or the quantity of oil therein.

9. An air line oiler including an oil reservoir, an air conduit associated therewith, and a fabric body communicating with said air conduit, and disposed in said reservoir in such a manner as to divide the same into separate chambers, and a passage through said body permitting oil to pass from one to another of said chambers.

10. An air line oiler including an air conduit, an oil reservoir comprising a plurality of chambers, and a fabric body communicating with said conduit and said reservoir, said body being arranged in such a manner that a portion thereof serves as an air passage to conduct air pressure pulsations from said conduit to said reservoir, and another portion thereof serves as an oil passage to conduct oil from the reservoir into the conduit.

In testimony whereof he affixes his signature.

JOHN E. RENFER.